(12) United States Patent
Riera-Palou et al.

(10) Patent No.: US 8,107,616 B2
(45) Date of Patent: Jan. 31, 2012

(54) ACOUSTIC ECHO CANCELLER

(75) Inventors: Felip Riera-Palou, Palma de Mallorca (ES); David Antoine Christian Marie Roovers, Eindhoven (NL); Cornelis Pieter Janse, Eindhoven (NL); Ivo Leon Diane Marie Merks, Eden Prairie, MN (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 933 days.

(21) Appl. No.: 12/090,498

(22) PCT Filed: Oct. 19, 2006

(86) PCT No.: PCT/IB2006/053856
§ 371 (c)(1),
(2), (4) Date: Apr. 17, 2008

(87) PCT Pub. No.: WO2007/046070
PCT Pub. Date: Apr. 26, 2007

(65) Prior Publication Data
US 2008/0253552 A1    Oct. 16, 2008

(30) Foreign Application Priority Data
Oct. 21, 2005    (EP) ..................................... 05109829

(51) Int. Cl.
H04M 9/08    (2006.01)
(52) U.S. Cl. .............. 379/406.03; 379/406.05
(58) Field of Classification Search ............. 379/406.03, 379/406.05
See application file for complete search history.

(56) References Cited

U.S. PATENT DOCUMENTS

| | | | |
|---|---|---|---|
| 6,510,224 B1 | 1/2003 | Christensson et al. | |
| 6,546,099 B2 | 4/2003 | Janse | |
| 2002/0159585 A1 | 10/2002 | Janse | |
| 2006/0098809 A1 * | 5/2006 | Nongpiur et al. | ........ 379/406.14 |

FOREIGN PATENT DOCUMENTS

| | | |
|---|---|---|
| EP | 1152547 A2 | 11/2001 |
| EP | 1578025 A1 | 9/2005 |
| WO | WO0072556 A1 | 11/2000 |

OTHER PUBLICATIONS

Wise et al: "Maximum Likelihood Pitch Estimation"; IEEE Transactions on Acoustics, Speech, and Signal Processing, vol. ASSP-24, No. 5, Oct. 1976, pp. 418-423.

Morgan et al: "Cochannel Speaker Separation by Harmonic Enhancement and Suppression"; IEEE Transactions on Speech and Audio Processing, vol. 5, No. 5, Sep. 1997, pp. 407-424.

* cited by examiner

*Primary Examiner* — Alexander Jamal

(57) ABSTRACT

An acoustic echo cancellation device (1) for canceling an echo in a microphone signal (z) in response to a far-end signal (x) comprises: an adaptive filter unit (10) arranged for filtering the far-end signal (x) so as to produce an echo cancellation signal (y), —a combination unit (12) arranged for combining the echo cancellation signal (y) with the microphone signal (z) so as to produce a residual signal (r), and a post-processor unit (13) arranged for substantially removing any remaining echoes from the residual signal. In accordance with the invention, the device further comprises: —a near-end pitch estimation unit (18) arranged for estimating the pitch of any near-end signal (s) contained in the microphone signal (z) and for controlling the post-processor unit (13) in dependence of the estimated pitch such that harmonics of the estimated pitch may be substantially preserved. The control unit may further be arranged for controlling the post-processor unit (13) in dependence of the estimated pitch of the residual signal in addition to the estimated pitch of the residual signal.

20 Claims, 3 Drawing Sheets

ACOUSTIC ECHO CANCELLER

FIELD OF THE INVENTION

The present invention relates to an acoustic echo canceller. More in particular, the present invention relates to an acoustic echo cancellation device for canceling an echo in a microphone signal in response to a far-end signal, the device comprising an adaptive filter unit arranged for filtering the far-end signal so as to produce an echo cancellation signal, a combination unit arranged for combining the echo cancellation signal with the microphone signal so as to produce a residual signal, and a post-processor unit arranged for substantially removing any remaining echoes from the residual signal.

BACKGROUND OF THE INVENTION

Echo cancellation devices are well known. When a loudspeaker and a microphone are positioned close together and used simultaneously, as in (hands-free) telephones, part of the far-end signal appears as an echo in the microphone signal. A typical echo cancellation device comprises an adaptive filter that models the acoustic path between the loudspeaker rendering the far-end signal and the microphone receiving both the echo and the near-end signal. If the echo cancellation signal produced by the adaptive filter is equal to the echo in the microphone signal, the echo can be cancelled out and only the near-end signal remains. However, the residual signal resulting from combining the microphone signal and the echo cancellation signal typically still contains echo components. To remove such echo components, a post-processor may be used to further process the residual signal and remove any remaining echo components. The post-processor unit provides a time and frequency dependent gain function that selectively attenuates those frequencies at which a significant residual far-end echo is present.

U.S. Pat. No. 6,546,099 (Philips) discloses an acoustic echo cancellation device which includes a post-processor. This Prior Art echo cancellation device further includes a spectrum estimator for determining the frequency spectrum of the echo cancellation signal. The post-processor comprises a filter which is dependent on the frequency spectrum of the echo cancellation signal. The use of such a post-processor significantly improves the suppression of the remaining echo in the residual signal. The entire contents of U.S. Pat. No. 6,546,099 are herewith incorporated in this document.

The arrangement known from U.S. Pat. No. 6,546,099 performs well in most cases. However, in some circumstances the remaining echo cannot be sufficiently suppressed without suppressing the entire near-end signal. In modern mobile (cellular) telephone devices, for example, the loudspeaker and the microphone are placed very close together. When used in hands-free mode, the echo may be much louder than the near-end signal, causing Prior Art echo cancellation devices to introduce audible signal distortions.

SUMMARY OF THE INVENTION

It is an object of the present invention to overcome these and other problems of the Prior Art and to provide an echo cancellation device and method which provide an excellent echo suppression while introducing essentially no audible signal distortion, even when the far-end echo is much louder than the near-end signal.

Accordingly, the present invention provides an acoustic echo cancellation device for canceling an echo in a microphone signal in response to a far-end signal, the device comprising:

an adaptive filter unit arranged for filtering the far-end signal so as to produce an echo cancellation signal, a combination unit arranged for combining the echo cancellation signal with the microphone signal so as to produce a residual signal, a post-processor unit arranged for substantially removing any remaining echoes from the residual signal, the device further comprising:

a near-end pitch estimation unit arranged for estimating the pitch of any near-end signal contained in the microphone signal and for controlling the post-processor unit in dependence of the estimated pitch such that harmonics of the estimated pitch may be substantially preserved.

By providing a near-end pitch estimation unit capable of estimating the pitch of the near-end signal, and a control unit capable of controlling the post-processor unit in dependence of the estimated pitch, the action of the post-processor is made dependent on the pitch of the near-end signal. In particular, the control unit may preserve, or at least substantially preserve, harmonics of the estimated pitch. That is, in dependence of the estimated pitch of the near-end signal harmonics of the estimated pitch may not be significantly attenuated by the post-processor unit. By preserving the harmonics of its pitch, an accidental suppression of the near-end signal by the post-processor is prevented.

It is noted that the term pitch often refers to the perceived frequency of an audio signal (such as a speech signal), which is determined by the fundamental frequency and its harmonics. However, the term pitch may also be used to refer exclusively to the fundamental frequency ($f_0$) of the signal. In the latter sense, most other frequencies of a speech signal are harmonics of the pitch ($n \times f_0$, where n=2, 3, 4, . . . ), and the pitch (or fundamental frequency) may then be referred to as "first harmonic" (n=1). In some cases the signal power of this fundamental frequency may be very small or even effectively absent, but its frequency may be determined from its harmonics. When in this document reference is made to preserving the harmonics of a certain pitch, it is typically implied that the pitch itself, being the "first harmonic", is also preserved.

Although the control unit is described here as a separate unit, it may be incorporated in the post-processor. That is, the post-processor unit may incorporate the pitch-dependent control function, as well as any other functions of the control unit.

In a preferred embodiment, the near-end pitch estimation unit of the present invention comprises:

a residual pitch estimation unit arranged for estimating the pitch of the residual signal so as to approximate the pitch of the near-end signal, and a control unit arranged for providing an attenuation control signal in dependence of the estimated pitch such that harmonics of the estimated pitch may be substantially preserved.

As the near-end signal is contained in the microphone signal, which also contains the echo signal, the near-end signal cannot be estimated directly. An indirect estimate of the near-end signal pitch can be obtained by estimating the pitch of the residual signal. If the echo cancellation signal produced by the adaptive filter is equal to the echo signal, the residual signal produced by the combination unit is equal to the near-end signal. Accordingly, the pitch of the residual signal provides a good first estimate of the pitch of the near-end signal.

However, in some circumstances the echo is not fully cancelled and the residual signal contains residual echo components, resulting in a deviation of the residual signal from the near-end signal. In such cases, the pitch estimate based on the residual signal may not be accurate enough.

Accordingly, a preferred embodiment of the device of the present invention further comprises an echo pitch estimation unit arranged for estimating the pitch of the echo cancellation signal, the control unit being arranged for controlling the post-processor in dependence of both the estimated pitch of the residual signal and the estimated pitch of the echo cancellation signal. By providing an echo pitch estimation unit which estimates the pitch of the echo cancellation signal, and hence indirectly estimates the pitch of the echo signal, a more accurate estimate of the near-end signal pitch may be obtained.

It is further preferred that the control unit is arranged for comparing the estimated pitch of the residual signal and the estimated pitch of the echo cancellation signal, and for controlling the post-processor unit such that harmonics of the estimated pitch are substantially preserved only if the estimated pitches differ. When the estimated pitch of the residual signal and the estimated pitch of the echo cancellation signal are substantially equal, the estimate of the residual signal pitch is probably incorrectly based on the residual echo and its harmonics should not be preserved.

Advantageously, the near-end pitch estimation unit may further comprise a comb filter unit arranged for filtering the residual signal prior to feeding the residual signal to the residual pitch estimation unit.

The comb filter unit is preferably controlled by the echo pitch estimation unit. The comb filter unit is arranged for filtering the residual signal r prior to estimating its pitch so as to attenuate any harmonics of the echo.

The present invention also provides a sound processing system, comprising a device as defined above, and a portable consumer device, such as a mobile telephone apparatus, comprising a device as defined above.

The present invention further provides a method of canceling an echo in a microphone signal in response to a far-end signal, the method comprising the steps of:

filtering the far-end signal so as to produce an echo cancellation signal, combining the echo cancellation signal with the microphone signal so as to produce a residual signal, and post-processing the residual signal so as to substantially removing any remaining echoes from said signal, the method further comprising the steps of:

estimating the pitch of any near-end signal contained in the microphone signal, and controlling the post-processing step in dependence of the estimated pitch such that harmonics of the estimated pitch may be substantially preserved.

The method of the present invention provides a significant improvement of the quality of the post-processed residual signal by preventing the accidental attenuation of the pitch harmonics of the near-end signal.

The method of the present invention preferably further comprises the step of estimating the pitch of the echo cancellation signal, the controlling step being arranged for controlling in dependence of both the estimated pitch of the residual signal and the estimated pitch of the echo cancellation signal.

The present invention additionally provides a computer program product for carrying out the method as defined above. A computer program product may comprise a set of computer executable instructions stored on a data carrier, such as a CD or a DVD. The set of computer executable instructions, which allow a programmable computer to carry out the method as defined above, may also be available for downloading from a remote server, for example via the Internet.

BRIEF DESCRIPTION OF THE DRAWINGS

The present invention will further be explained below with reference to exemplary embodiments illustrated in the accompanying drawings, in which.

DETAILED DESCRIPTION

Figure 1:
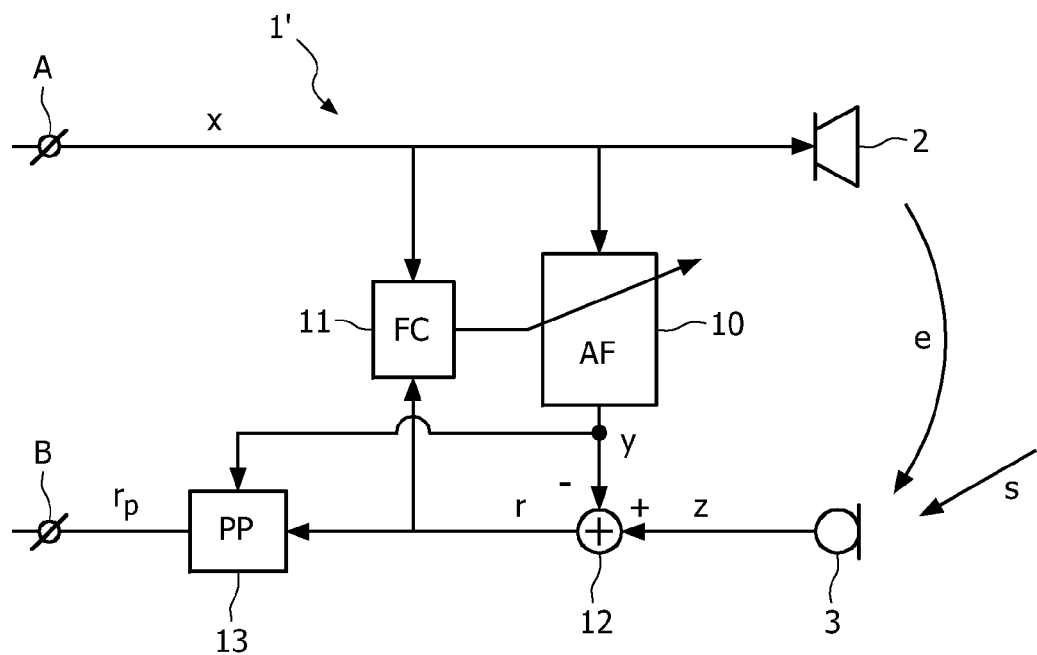
FIG. 1 schematically shows an acoustic echo cancellation device according to the Prior Art.

The acoustic echo cancellation device 1' according to the Prior Art shown schematically in FIG. 1 comprises an adaptive filter (AF) unit 10, a filter coefficients (FC) unit 11, a combination unit 12 and a post-processor (PP) unit 13. The device 1' may further comprise a D/A (digital/analog) converter, a A/D (analog/digital) converter, an amplifier and other components which are not shown in FIG. 1 for the sake of clarity of the illustration.

A far-end signal x is received at the input terminal A of the device 1'. The input signal x is fed to a loudspeaker 2 which converts this signal into sound. Part of this sound is received by the microphone 3 as an acoustic echo e. The microphone 3 also receives the acoustic near-end sound s and converts the combination of the echo e and the near-end sound s into a microphone signal z, which is fed to the combination unit 12.

The input signal x is also fed to the adaptive filter unit 10 and the associated filter coefficients unit (or filter update) unit 11, which also receives the residual signal r and sets the coefficients of the adaptive filter 10 such that the correlation between the signals x and r is minimal.

The adaptive filter unit 10 filters the input signal x and produces an echo cancellation signal y that ideally is equal to the echo component of the microphone signal z. The microphone signal z and the echo cancellation signal y are combined in the combination unit 12, which in the present example is constituted by an adder. The echo cancellation signal y is added with a negative sign and is therefore subtracted from the microphone signal z, yielding the residual signal r.

Although the residual signal r ideally contains no echo components, in practice some echo components will remain. For this reason a post-processor 13 is added, which further processes the residual signal r to yield a processed residual signal $r_p$. The post-processor 13 also receives the echo cancellation signal y to further process the residual signal r in dependence of the signal y. A suitable processing operation is spectral subtraction, where the absolute value $|R_p|$ of the frequency spectrum of the residual signal $r_p$ is, for example, determined by $|R_p|=|R|-\gamma\cdot|Y|$, where $|R|$ and $|Y|$ are the absolute values of the frequency spectra of the signals r and y respectively, and where $\gamma$ is an over-subtraction parameter. Post-processing operations of this type are described in more detail in U.S. Pat. No. 6,546,099 referred to above. The processed residual signal $r_p$ output by the post-processor unit 13 is fed to the output terminal B of the device 1'.

It has been found that in some circumstances, the quality of the output signal $r_p$ produced by the Prior Art device 1' illustrated in FIG. 1 is not satisfactory. When a (mobile or wireless) telephone handset is used in hands-free mode, for example, the echo e may be much louder than the near-end sound s, especially when the person speaking is relatively far away from the handset. As a result, the near-end signal will be largely suppressed by the device 1'. The echo cancellation signal y will be almost equal to the microphone signal z and any remaining components of the near-end signal are attenuated by the post-processor. The resulting output signal $r_p$ will be distorted.

The present invention solves this problem by suitably controlling the post-processor in dependence of the near-end signal.

Figure 2:
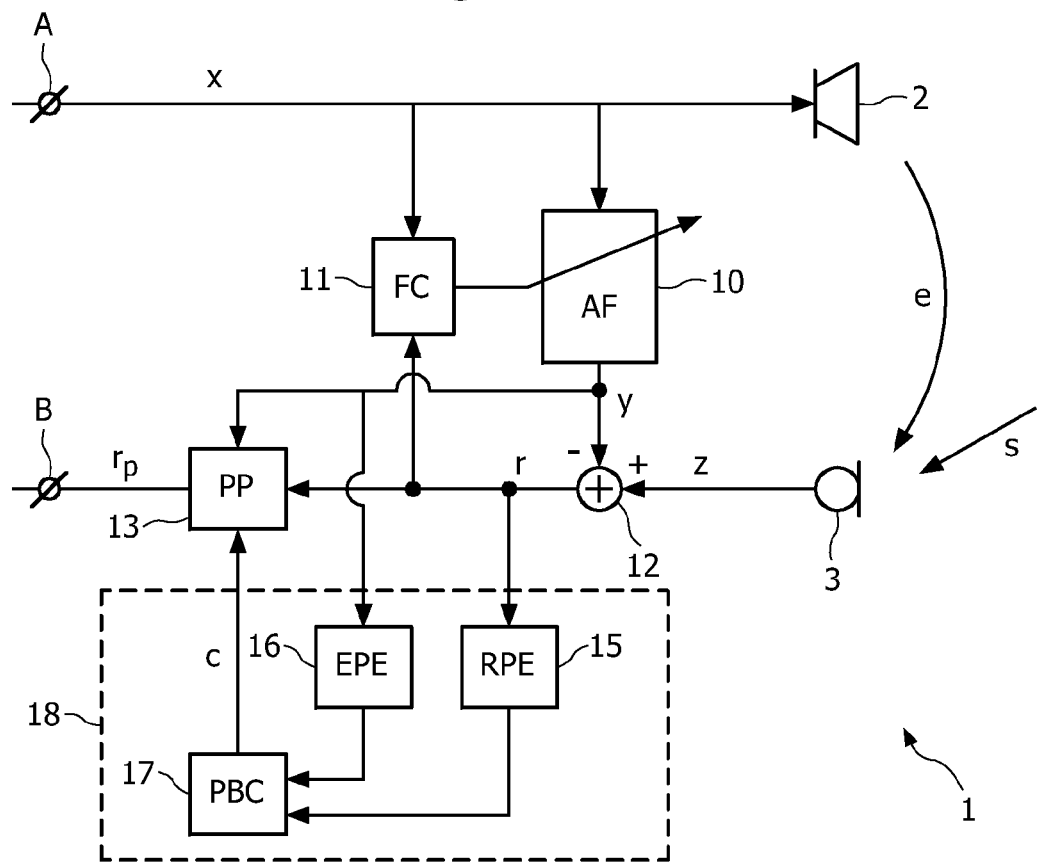
FIG. 2 schematically shows a first embodiment of an acoustic echo cancellation device according to the present invention.

The acoustic echo cancellation device 1 according to the present invention shown merely by way of non-limiting example in FIG. 2 also comprises an adaptive filter (AF) unit 10, a filter coefficients (FC) unit 11, a combination unit 12 and a post-processor (PP) unit 13. In addition, the device 1 of the present invention comprises a near-end pitch estimation unit 18 which is arranged for estimating the pitch of the near-end signal s and producing an attenuation control signal (or set of signals) c.

It will be clear to those skilled in the art that the device 1 may further comprise an amplifier, a D/A (digital/analog) converter, A/D (analog/digital) converter, one or more band pass filters, and other components which are not shown in FIG. 2 for the sake of clarity of the illustration.

The near-end pitch estimation unit 18 shown in FIG. 2 is coupled to the output of the combination unit 12 and to the output of the adaptive filter unit 10 to receive the residual signal r and the echo cancellation signal y respectively. The near-end pitch estimation unit 18 is shown to comprise a residual pitch estimation (RPE) unit 15 to which the residual signal r is fed, and an echo pitch estimation (EPE) unit 16 which receives the echo cancellation signal y. Each of these pitch estimation units 15 and 16 estimates the pitch (fundamental frequency) of the respective signal and feeds this pitch information to a pitch-based control (PBC) unit 17, which in the embodiment shown is also part of the near-end pitch estimation unit 18. The pitch-based control (PBC) unit 17 compares the pitch information and outputs a corresponding attenuation control signal c which is fed to the post-processor 13.

The post-processor 13 attempts to remove any echo components remaining in the residual signal r by time and frequency dependent attenuation. To this end, the post-processor provides a time and frequency dependent gain function that selectively attenuates those frequency bins in which significant residual far end echo is present. This gain function may be determined using spectral subtraction, as mentioned above with reference to FIG. 1. The absolute value $|R_p|$ of the frequency spectrum of the residual signal $r_p$ is, for example, determined by $|R_p|=|R|-\gamma \cdot |Y|$, where $|R|$ and $|Y|$ are the absolute values of the frequency spectra of the signals r and y respectively, and where $\gamma$ is an over-subtraction parameter. Other spectral subtraction methods involve splitting the spectrum Y up into constituent parts, each having an individual value of $\gamma$, and/or may involve the spectrum Z of the microphone signal z. Post-processing operations of this type are described in more detail in U.S. Pat. No. 6,546,099 referred to above.

When the echo e is much louder than the near-end sound s, the signal level of the echo suppression signal y will be high relative to the near-end signal. As a result, the post-processor may attenuate the near-end signal to the extent that the output signal (processed residual signal) $r_p$ is distorted. To prevent this, the post-processor 13 illustrated in FIG. 2 has an additional input for receiving an attenuation control signal c. This attenuation control signal (or attenuation control signal) c allows certain frequency bands to be exempt from attenuation during a certain time period, or at least to limit the attenuation in those frequency bands, so as to preserve any components of the near-end signal that are present in those frequency bands. This will later be further explained with reference to FIG. 4.

It is noted that the attenuation of the relevant frequency bands may be either uniform (all frequency band containing near-end signal components receiving a uniform attenuation in the post-processor, typically no attenuation) or selective (all relevant frequency bands receiving an individual attenuation). A selective attenuation allows a frequency shaping of the processed residual signal, for example by subjecting this signal to an attenuation which increases with frequency. The selective attenuation information can be used in the pitch-based control unit 17 to produce the attenuation control signal c.

The near-end pitch estimation unit 18 estimates the pitch of the near-end signal. As this signal is not directly available, an indirect estimate or approximation has to be made. A first approximation is based upon the residual signal r, which contains the near-end signal. The residual pitch estimator (RPE) unit 15 provides an estimate of this pitch and feeds this estimate information to the pitch-based control (PBC) unit 17, where it is converted into an attenuation control signal c.

Under ideal conditions, the residual signal r yields an excellent estimate of the near-end signal. However, when the echo is relatively large, the residual signal typically still contains echo components, which cause the estimate of the near-end pitch to be less reliable. In addition, the residual pitch estimation unit 15 cannot distinguish between the near-end pitch and the (residual) echo pitch. For this reason, the near-end pitch estimation unit 18 illustrated in FIG. 2 also includes a echo pitch estimation (EPE) unit 16 arranged for estimating the pitch of the echo cancellation signal. In an alternative embodiment (not shown), the near-end pitch estimation unit 18 does not include the echo pitch estimation (EPE) unit 16 and the attenuation control signal c is based upon the pitch of the residual signal r only.

The echo pitch estimation (EPE) unit 16 provides an estimate of the pitch of the echo cancellation signal y. It is noted that pitch estimation techniques are well known in the art. A suitable pitch estimation technique is described in the paper "Maximum Likelihood Pitch Estimation" by J. D. Wise, J. R. Caprio and Th. W. Parks, IEEE Transactions on Acoustics, Speech and Signal Processing, Vol. ASSP-24, No. 5, October 1976.

When the pitch of the echo cancellation signal y has been determined by the echo pitch estimation (EPE) unit 16, the pitch-based control unit 17 then compares the pitch estimates (that is, the frequencies) produced by the units 15 and 16. If the estimated pitch values are different, the residual signal pitch estimate is deemed correct and the attenuation control signal c is produced. However, if the estimated pitch values are approximately equal, the residual signal pitch estimate is deemed incorrect and the attenuation of the post-processor is not altered. Effectively, the pitch-based control unit 17 checks whether the pitch estimated by the RPE 15 is the pitch of the near-end signal.

It is noted that the pitch estimation and the determination of the attenuation control signal c may be repeated regularly, for example every time frame or every millisecond.

The near-end estimation unit 18 may further comprise a voiced/unvoiced detector unit (not shown) for detecting whether the near-end signal contains voiced speech. The voiced/unvoiced detector unit may be connected in parallel with the residual pitch estimation unit 15, receiving the residual signal r from the output of the combination unit 12 and feeding a voiced/unvoiced signal to the pitch-based control unit 17 to preserve a detected pitch and its harmonics only when a voiced speech signal is present. As only voiced speech signals have a real pitch in the sense used here, pitch preservation in the case of unvoiced speech may lead to distortion. For this reason, the pitch-based control unit 17 may be arranged for only preventing the attenuation of an estimated pitch signal and its harmonics when a voiced speech signal is detected by the voiced/unvoiced detector. Voiced/unvoiced detection techniques are well known in the art.

Figure 3:
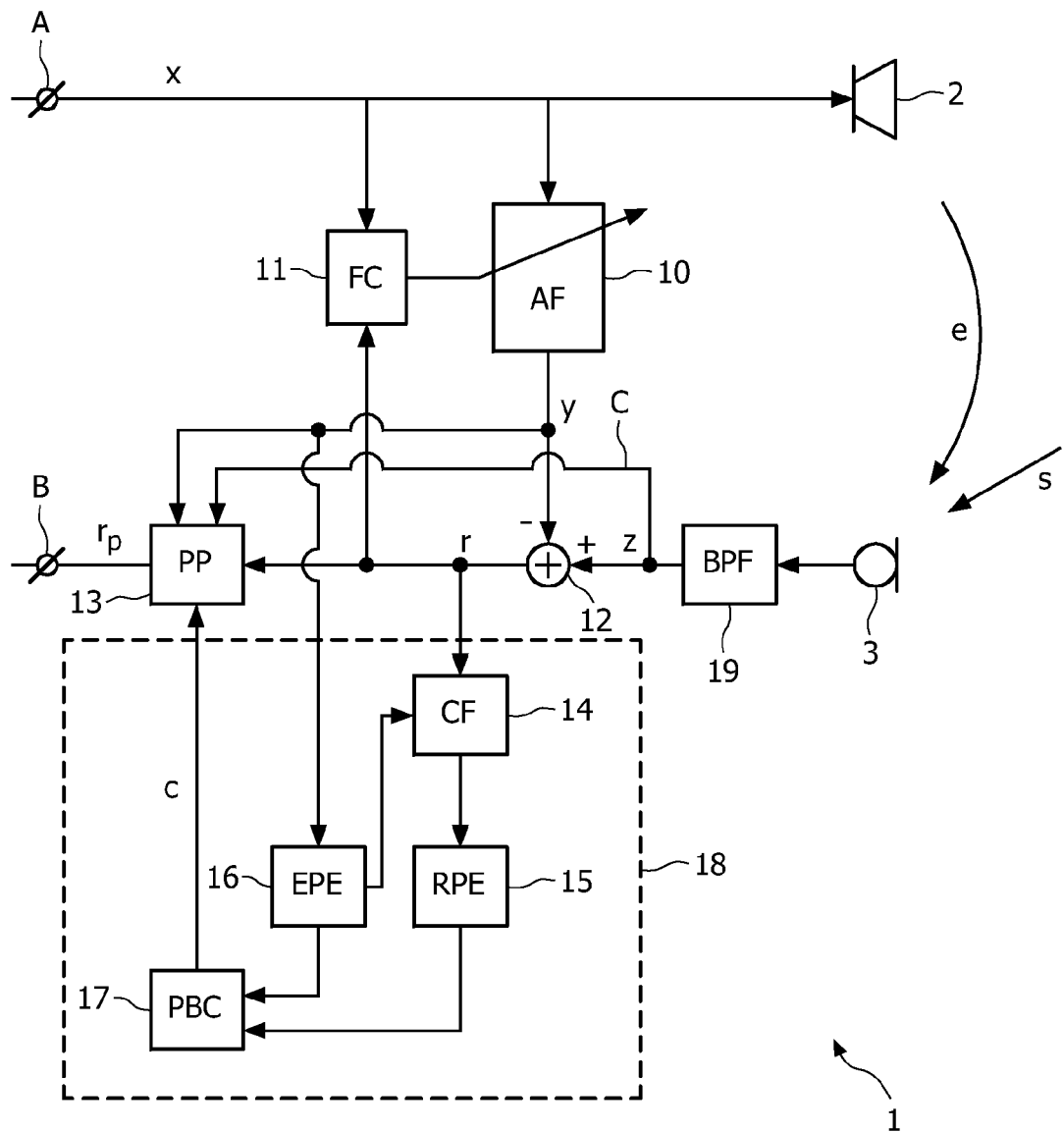
FIG. 3 schematically shows a second embodiment of an acoustic echo cancellation device according to the present invention.

In the embodiment of FIG. 3, the near-end estimation unit 18 is shown to comprise a comb filter (CF) unit 14 arranged between the combination unit 12 and the residual pitch estimation (RPE) unit 15. The comb filter unit 14 receives a control signal from the echo pitch estimation (EPE) unit 16.

The comb filter unit 14 is arranged for filtering the residual signal r prior to estimating its pitch so as to attenuate any harmonics of the echo, that is, of the far-end signal x. The coefficients of the comb filter 14 are dependent on the estimated pitch of the echo cancellation signal y and are controlled by the echo pitch estimation unit 16. As echo harmonics are suppressed, the estimate provided by the residual pitch estimation unit 15 is improved.

The embodiment of FIG. 3 further shows an optional connection C between the input of the combination unit 12 and the post-processor. This connection serves to feed the microphone signal z to the post-processor, allowing the post-processor to utilize this signal. However, this connection is not essential and the microphone signal z may, if necessary, be derived from the echo cancellation signal y and the residual signal r using the formula z=r+y.

In addition, the embodiment of FIG. 3 comprises an optional band pass filter (BPF) unit 19 coupled between the microphone 3 and the combination unit 12. This filter unit serves to suppress any frequencies which are not part of the near-end sound s, thus facilitating the task of the acoustic echo canceller 1.

Figure 4:
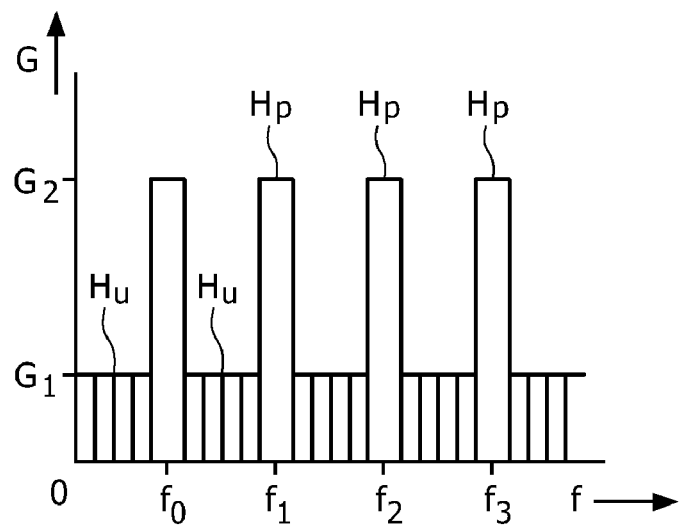
FIG. 4 schematically shows the power of a speech signal as a function of the frequency.

The selective attenuation provided by the present invention is illustrated in FIG. 4, which schematically shows the gain G of the post-processor (13 in FIGS. 2 & 3) as a function of the frequency (or frequency bins number) f. In the example of FIG. 4, the gain G is shown to have two levels: a relatively low level $G_1$ and a relatively high level $G_2$ (for example equal to 1.0). The lower level $G_1$ may, for example, correspond with a gain equal to 0.3 (which amounts to an attenuation of −10.5 dB) while the higher level $G_2$ may, for example, correspond with a gain equal to 1.0 (which amounts to an attenuation of 0 dB).

The gain has the higher level $G_2$ in the protected frequency ranges (or frequency bins) $H_p$ at frequencies $f_0$, $f_1$, $f_2$ and $f_3$, while having the lower level $G_1$ in the unprotected frequency ranges $H_u$ at the remaining frequencies. In the example shown, the protected frequency ranges $H_p$ correspond with the estimated pitch or fundamental frequency $f_0$ and its harmonics $f_1$, $f_2$ and $f_3$ of a near-end signal. As is well known, the harmonics are located at $n \times f_0$, where n=2, 3, 4. If the pitch or fundamental frequency $f_0$ is known, for example by estimation, the harmonic frequencies are therefore also known.

According to the present invention, the pitch $f_0$ of the near-end signal is estimated. Once this pitch is known, a suitable attenuation control signal (c in FIGS. 2 and 3) is sent to the post-processor which substantially prevents or limits the attenuation of these frequencies. In the example of FIG. 4, frequency bands $H_p$ are defined, which typically correspond with the peaks in the frequency spectrum of the near-end signal (not shown). In these protected frequency bands, the attenuation of the post-processor is substantially prevented.

Accordingly, by preventing the attenuation of the near-end signal at its fundamental frequency and harmonics, it is prevented that the post-processor introduces any distortion of the near-end signal and the quality of the output signal $r_p$, the processed residual signal, is significantly improved.

Figure 5:
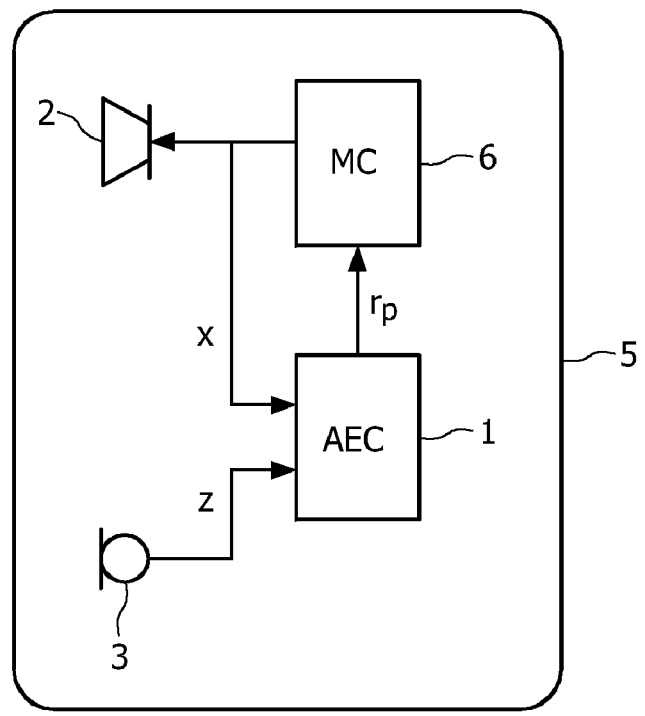
FIG. 5 schematically shows a consumer device according to the present invention.

The consumer device 5 schematically illustrated in FIG. 5 comprises an acoustic echo cancellation (AEC) device 1 according to the present invention, as well as a loudspeaker 2 and a microphone 3. In the embodiment shown in FIG. 5, the consumer device 5 is a mobile (that is, cellular) telephone apparatus comprising a mobile communications (MC) unit 6 which is coupled with the acoustic echo cancellation (AEC) device 1, the loudspeaker 2 and the microphone 3. The consumer device 5 of the present invention has a significantly improved sound quality due to the superior properties of the acoustic echo cancellation device 1.

The present invention may be implemented in hardware and/or in software. Hardware implementations may include an application-specific integrated circuit (ASIC). Software implementations may include a software program capable of being executed on a regular or special-purpose computer.

The present invention is based upon the insight that the post-processing of the residual signal of an acoustic echo canceller may be improved by taking the frequency structure of the near-end signal into account, and in particular preventing the attenuation of the harmonics of the near-end signal. The present invention benefits from the further insight that the pitch of the near-end signal can be estimated using the residual signal and preferably also the echo cancellation signal.

It is noted that any terms used in this document should not be construed so as to limit the scope of the present invention. In particular, the words "comprise(s)" and "comprising" are not meant to exclude any elements not specifically stated. Single (circuit) elements may be substituted with multiple (circuit) elements or with their equivalents.

It will be understood by those skilled in the art that the present invention is not limited to the embodiments illustrated above and that many modifications and additions may be made without departing from the scope of the invention as defined in the appending claims.

The invention claimed is:

1. An acoustic echo cancellation device for canceling an echo (e) in a microphone signal (z) in response to a far-end signal (x), the device comprising:
   an adaptive filter unit arranged for filtering the far-end signal (x) so as to produce an echo cancellation signal (y);
   a combination unit arranged for combining the echo cancellation signal (y) with the microphone signal (z) so as to produce a residual signal (r);
   a post-processor unit arranged for substantially removing any remaining echoes from the residual signal; and
   a near-end pitch estimation unit arranged afor estimating the pitch of any near-end signal (s) contained in the microphone signal (z) and (ii) for controlling the post-processor unit in dependence of the estimated pitch of the corresponding any near-end signal (s) such that (ii) (a) harmonics of the estimated pitch of the corresponding any near-end signal (s) may be substantially preserved and (ii) (b) an accidental suppression of the corresponding any near-end signal (s) prevented.

2. The device according to claim 1, wherein the near-end pitch estimation unit comprises:
a residual pitch estimation unit arranged for estimating the pitch of the residual signal (r) so as to approximate the pitch of the corresponding any near-end signal (s), and
a control unit arranged for providing an attenuation control signal (c) in dependence of the estimated pitch such that harmonics of the estimated pitch may be substantially preserved and an accidental suppression of the corresponding any near-end signal (s) prevented.

3. An acoustic echo cancellation device for canceling an echo (e) in a microphone signal (z) in response to a far-end signal (x), the device comprising:
an adaptive filter unit arranged for filtering the far-end signal (x) so as to produce an echo cancellation signal (y);
a combination unit arranged for combining the echo cancellation signal (y) with the microphone signal (z) so as to produce a residual signal (r);
a post-processor unit arranged for substantially removing any remaining echoes from the residual signal; and
a near-end pitch estimation unit arranged (i) for estimating the pitch of any near-end signal (s) contained in the microphone signal (z) and (ii) for controlling the post-processor unit in dependence of the estimated pitch such that harmonics of the estimated pitch may be substantially preserved, wherein the near-end pitch estimation unit comprises:
a residual pitch estimation unit arranged for estimating the pitch of the residual signal (r) so as to approximate the pitch of the near-end signal (s);
an echo pitch estimation unit arranged for estimating the pitch of the echo cancellation signal (y); and
a control unit arranged for providing an attenuation control signal (c) in dependence of the estimated pitch such that harmonics of the estimated pitch may be substantially preserved, wherein the control unit is further arranged for providing the attenuation control signal (c) in dependence of both the estimated pitch of the residual signal (r) and the estimated pitch of the echo cancellation signal (y).

4. The device according to claim 3, wherein the control unit is further arranged for comparing the estimated pitch of the residual signal (r) and the estimated pitch of the echo cancellation signal (y), and for controlling the post-processor unit such that harmonics of the estimated pitch are substantially preserved only if the estimated pitches differ.

5. The device according to claim 2, wherein the near-end pitch estimation unit further comprises a comb filter unit arranged for filtering the residual signal (r) prior to feeding the residual signal (r) to the residual pitch estimation unit.

6. The device according to claim 5, wherein the comb filter unit is controlled by an echo pitch estimation unit.

7. The device according to claim 1, further comprising a voiced/unvoiced detection unit for detecting whether the near-end signal (s) is voiced or unvoiced.

8. The device according to claim 1, wherein the post-processor is arranged for additionally utilizing the microphone signal (z).

9. The device according to claim 1, further comprising:
a band pass filter unit for band pass filtering the microphone signal (z) prior to feeding the microphone signal to the combination unit.

10. A sound processing system, comprising an acoustic echo cancellation device according to claim 1.

11. A portable consumer device, comprising an acoustic echo cancellation device according to claim 1.

12. A method of canceling an echo in a microphone signal (z) in response to a far-end signal (x), the method comprising the steps of:
filtering, via an adaptive filter, the far-end signal (x) so as to produce an echo cancellation signal (y);
combining, via a combining unit, the echo cancellation signal (y) with the microphone signal (z) so as to produce a residual signal (r); and
post-processing, via a post-processing unit, the residual signal (r) so as to substantially removing any remaining echoes from said signal, the method further comprising the steps of:
estimating, via a near-end pitch estimation unit, the pitch of any near-end signal (s) contained in the microphone signal (z), wherein the near-end pitch estimation unit includes a residual pitch estimation unit arranged for estimating the pitch of the residual signal (r) so as to approximate the pitch of the corresponding any near-end signal (s) and
controlling, via a pitch-based control unit, the post-processing step in dependence of the estimated pitch of the corresponding any near-end signal (s) such that (i) harmonics of the estimated pitch of the corresponding any near-end signal (s) may be substantially preserved and (ii) an accidental suppression of the corresponding any near-end signal (s) prevented.

13. The method according to claim 12, further comprising the step of estimating, via an echo pitch estimation unit, the pitch of the echo cancellation signal (y), the controlling step further being arranged for providing an attenuation control signal (c) in dependence of both the estimated pitch of the residual signal (r) and (ii) the estimated pitch of the echo cancellation signal (y) such that (iii)(a) harmonics of the estimated pitch of the corresponding any near-end signal (s) may be substantially preserved and (iii)(b) an accidental suppression of the corresponding any near-end signal (s) prevented.

14. The method according to claim 12, further comprising the step of detecting whether the near-end signal (s) is voiced or unvoiced.

15. A computer program product for carrying out the echo cancellation method according to claim 12.

16. The device according to claim 2, wherein the near-end pitch estimation unit further comprises:
an echo pitch estimation unit arranged for estimating the pitch of the echo cancellation signal (y), wherein the control unit is further arranged for providing the attenuation control signal (c) in dependence of both the estimated pitch of the residual signal (r) and the estimated pitch of the echo cancellation signal (y).

17. The device according to claim 16, wherein the control unit is further arranged for comparing the estimated pitch of the residual signal (r) and the estimated pitch of the echo cancellation signal (y), and for controlling the post-processor unit such that harmonics of the estimated pitch are substantially preserved only if the estimated pitches differ.

18. The method according to claim 13, wherein the controlling step further being arranged for providing the attenuation control signal (c) in dependence of a comparison of the estimated pitch of the residual signal (r) and the estimated pitch of the echo cancellation signal (y), and controlling the post-processor step such that harmonics of the estimated pitch are substantially preserved only if the estimated pitches differ.

19. The method according to claim 13, wherein estimating, via the near-end pitch estimation unit, further comprises filtering, via a comb filter unit, the residual signal (r) prior to feeding the residual signal (r) to the residual pitch estimation unit.

20. The method according to claim 19, further comprising controlling, via an echo pitch estimation unit, the filtering carried out by the comb filter unit.

* * * * *